Patented June 20, 1944

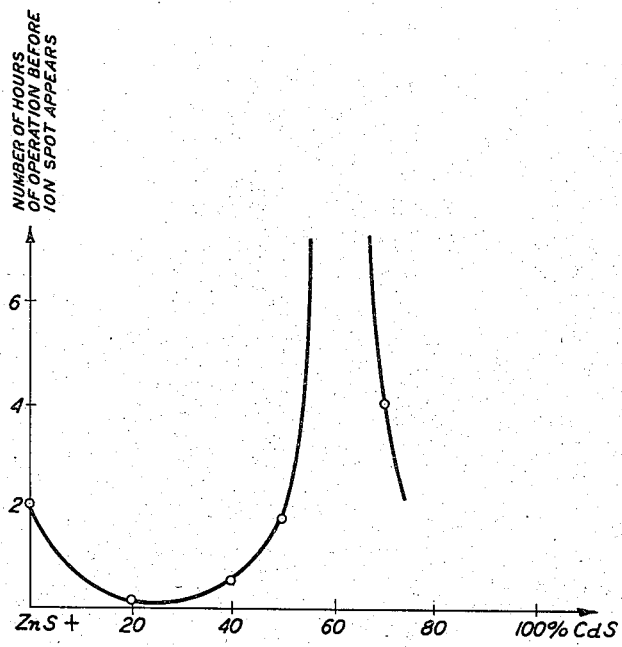

2,352,035

UNITED STATES PATENT OFFICE 2,352,035

LUMINESCENT MATERIAL

Heinrich Strübig, Teltow, and Walter Hass, Kleinmachnow, near Berlin, Germany; vested in the Alien Property Custodian Application December 9, 1941, Serial No. 422,216
In Germany February 10, 1940

7 Claims. (Cl. 250—80)

The invention relates to luminescent materials and to a process for synthesizing luminescent materials and, in particular, is directed to producing luminescent materials of improved properties and with the further advantage that the resistance of the resultant material against loss of luminosity by impacting ions is greatly reduced.

Luminescent materials particularly those adapted to become excited under the influence of electric bombardment such as cathode ray beams in tubes used for television, oscillographs and allied uses have been known for some time. These materials have had the drawback that during the operation of the tube or other electronic device using the material, a dark spot of larger or smaller dimensions appeared on the fluorescent screen, this spot becoming darker and darker with increasing time of operation. The existence of this spot is explained by the fact that an ion stream is produced within the tube and this ion stream remains undeflected by the magnetic deflecting means so that the ions always impact the same spot of the luminescent screen during the entire period of operation. This ion bombardment reduces the luminescence of the luminescent material.

It is known that zinc silicate and borium nitrate are sufficiently insensitive to impacting ions. These materials however can not be used in many cases on account of other undesirable properties. The opinion has been up to now that zinc sulfide and cadmium sulfide are very sensitive to ion bombardment so that their luminosity is reduced within very short periods of operation.

Accordingly it is one of the objects of our invention to provide a luminescent material of the zinc-cadmium sulfide type whose sensitivity against the influences of ion bombardment is greatly reduced.

A further object of our invention is to provide a luminescent material of the sulfide type which will emit white light of high intensity under cathode ray bombardment.

Other objects and advantages of our invention will be immediately apparent to those skilled in the art upon reading the following description of our invention.

According to the invention the luminescent material is a crystalline structure comprising the components of the sulfide type in a single crystal lattice structure in such a composition that the components are in stoichiometric equilibrium in the crystal. The luminescent material contains, for example, zinc sulfide (ZnS) and cadmium sulfide (CdS) in stoichiometric equilibrium. The molecular weight of ZnS is 97.44 and the molecular weight of CdS is 144.47. A zinc-cadmium sulfide containing 59.6 weight per cent of CdS is a crystal including one mol CdS for every mol ZnS. A crystalline luminescent material of this nature is particularly safe against ion bombardment.

The figure shows a curve representing by way of example the sensitivity of the luminescent material against ion bombardment with relation to the CdS content. The ordinate represents the period of time of ion bombardment in hours after which the ion spot appears upon the luminescent screen and the abscissa shows the content of CdS in per cent. The curve has been found by experiments. A luminescent material of 60% CdS does not show any blackening or darkening or loss of luminosity after 20 hours and more of operation.

A luminescent material of this type is by way of example produced in a process shortly described as follows: Zinc sulfide is precipitated from a solution of zinc nitrate by sulphuretted hydrogen. In a similar manner cadmium sulfide is precipitated from a solution of cadimum-nitrate. The two substances are dried and finely pulverized and mixed in the correct proportion so that the two substances are in stoichiometric equilibrium after their combination. The mixture is then placed into a crucible and sulphur is added in sufficient quantity. The charge is heated by any appropriate manner until the substances combine. The charge is then taken out after cooling and the core of the charge is used as luminescent material.

A luminescent material of the described composition emits a yellow light. In order to obtain a white colour it is preferable to add a luminescent material of complemental colour. This added component must also be insensitive to ion bombardment. It has been found that a material emitting white light is obtained if 70% of a ZnCdS material with a CdS content of 60% is mixed with 30% pure ZnS. A material of this type is sufficiently insensitive to ion bombardment provided that the mixture is not heated higher than 300° C. after mixing. If the material is heated to a higher temperature a reaction takes place between the components and an ion spot will show after half an hour of operation. This result has a good coincidence with the measurements represented in the figure because by the reaction a crystal with approximately 40% CdS is produced.

It is however also possible to obtain a material emitting white light which is absolutely safe against ion bombardment by mixing the components in such a manner that the final mixture contains one mol ZnS for every mol CdS. If in such a case a reaction takes place on account of high temperatures a stable crystal will be produced at least upon the surface of the screen so that the ion spot can not appear. Good results have been obtained with a mixture containing 20% ZnCdS with 20% CdS and 80% ZnCdS with 70% CdS. A material of this type shows white light with a very faint strawberry coloured shade. This material has been safe against ion bombardment after 20 hours of operation and more.

It is also possible to change the colour of the emitted light by adding activators so that any desired shades can be obtained.

The invention is not limited to the zinc-cadmium sulfide materials above mentioned which are particularly insensitive to ion bombardment and therefore very suitable as substances for producing luminescent screens of television receiving tubes. The invention relates also to all crystalline luminescent materials composed in a similar manner. In such materials the amount of the components is so chosen that the components are in stoichiometric equilibrium so that the resultant crystal is safe against ion bombardment.

What we claim is:

1. In a fluorescent screen of the character described, a luminescent material having the characteristic that when subjected to ion bombardments it is resistant to the formation of dark spots, said material consisting of zinc sulfide and cadmium sulfide in such quantities that there is substantially one mol of zinc sulfide for each mol of cadmium sulfide.

2. A crystalline luminescent material consisting of zinc sulfide and cadmium sulfide in such quantities that there is substantially one mol of zinc sulfide for each mol of cadmium sulfide.

3. A luminescent material comprising crystals of mixed composition containing approximately 60% cadmium sulfide and approximately 40% zinc sulfide.

4. A luminescent material emitting white light under cathode ray bombardment consisting of 70% of a crystalline material, containing 60% cadmium sulfide and 40% zinc sulfide, and of 30% pure zinc sulfide.

5. A luminescent material comprising a mixture of zinc-cadmium sulfide materials of different cadmium sulfide content, the amounts of the different mixed crystal components being chosen in such a manner that for one mol of zinc sulfide, substantially one mol of cadmium sulfide is present in the final substance.

6. A luminescent material comprising a mixture of about 20 per cent of a first material comprising a zinc-cadmium sulfide containing approximately 20 per cent of cadmium sulfide, and about 80 per cent of a second material comprising a zinc-cadmium sulfide containing approximately 70 per cent of cadmium sulfide.

7. The method of forming a luminescent material which comprises making a finely pulverized mixture of zinc sulfide and cadmium sulfide in the proportions of one mol of the former to one mol of the latter, heating said mixture with sulphur until these substances combine, and cooling the resultant material.

HEINRICH STRÜBIG.
WALTER HASS.